United States Patent [19]
Weber

[11] Patent Number: 5,020,111
[45] Date of Patent: May 28, 1991

[54] SPATIAL SYMMETRY CUEING IMAGE PROCESSING METHOD AND APPARATUS

[75] Inventor: Bruce A. Weber, Silver Spring, Md.

[73] Assignee: The United States of America as represented by the Secretary of the Army, Washington, D.C.

[21] Appl. No.: 260,424

[22] Filed: Oct. 14, 1988

[51] Int. Cl.$^5$ .................. G06K 9/46; G02B 27/46; G06E 1/00

[52] U.S. Cl. .................. 382/31; 350/162.12; 382/46; 382/42; 364/822

[58] Field of Search .................. 382/36, 42, 46, 31; 350/3.64, 162.12, 162.13, 162.14; 364/822

[56] References Cited

U.S. PATENT DOCUMENTS

| | | | |
|---|---|---|---|
| 3,196,395 | 7/1965 | Clowes et al. | 382/42 |
| 4,084,255 | 4/1978 | Casasent et al. | 364/822 |
| 4,111,526 | 9/1978 | Joseph | 350/162.13 |
| 4,174,884 | 11/1979 | Joseph et al. | 350/162.13 |
| 4,838,644 | 6/1989 | Ochoa et al. | 382/42 |
| 4,866,534 | 9/1989 | Tada | 382/42 |

OTHER PUBLICATIONS

White et al., "Real-Time Image Processing via Four-Wave Mixing in a Photorefractive Medium," Appl. Phys. Lett., vol. 37, No. 1, Jul. 1, 1980, pp. 5-7.

Goodman, Introduction to Fourier Optics, McGraw-Hill, 1968, pp. 171-184.

Giles et al., "Optical Image Correlation Using a Deformable Mirror Device: A Feasibility Study," SPIE, Jan. 1987.

Khadr et al., "Symmetry Perception by Optical Transformation," Optical Society of America, 1987 Annual Meeting, Technical Digest, Oct. 18-23, 1987.

Primary Examiner—Rodney B. Bovernick
Assistant Examiner—David R. Parsons
Attorney, Agent, or Firm—Saul Elbaum; Guy M. Miller

[57] ABSTRACT

An optical correlation method and apparatus recognizes and locates specific patterns in a scene based on the spatial symmetries associated with that pattern. An input scene is divided into two identical scenes, one of which plays the role of the input scene and the other the role of the filter scene. The filter image is passed through a spatial operator before being sent, along with the input image, to a real-time correlator. The real-time output from the correlator is compared to the input scene. Bright spots or regions in the correlation image represent objects with symmetry. This technique does not depend on comparison of the received image with a standard or stored image, consequently, it overcomes the traditional handicap of sensitivity to both the aspect and range of the viewer.

15 Claims, 6 Drawing Sheets

SPATIAL SYMMETRY CUEING IMAGE PROCESSING METHOD AND APPARATUS

RIGHTS OF THE GOVERNMENT

The invention described herein may be manufactured, used and licensed by or for the United States Government for Governmental purposes without payment to me of any royalty thereon.

BACKGROUND OF THE INVENTION

1. Field of the Invention

The present invention relates to image processing and, more particularly, is directed towards a process which detects the presence of man-made objects in an arbitrary scene using Fourier transform spatial filtering.

2. Description of the Prior Art

The detection of man-made objects in an arbitrary background is of fundamental importance in problems of surveillance, target detection and target tracking. Systems automated to achieve these ends must be able to react in real-time to a changing scene as well as account for aspect and range dependent target profiles. The goals to be achieved can be categorized as object detection, classification, and identification. Detection simply means that an object is observed without any reference to what the object is; classification means that an object has been identified as belonging to a class, such as a tree, a tank, or a man; and identification means distinguishing between objects of the same class, and naming the object such as an oak tree, an M-60 tank, or an American soldier.

Each of these goals require different degrees of shape information. Thus for detection, information on spatial geometry is not necessary but relative size is. For classification, spatial geometry is essential however image resolution requires only silhouette detail. Identification, however, requires resolution sufficient to resolve structural elements internal to the overall silhouette outline.

Real-time optical processors have long been recognized for such potential applications as optical computing, robotic vision, image understanding, and pattern recognition. In particular, optical processors offer a powerful high speed alternative to electronic processors due to their ability to process in parallel a large amount of information. One example is the optical correlator proposed by A. B. Vander Lugt in which prerecorded Fourier filters are used to identify the presence of specific objects. In a modern version of the Vander Lugt processor the photographically stored Fourier filters are replaced by a photorefractive nonlinear optical medium or crystal. The advantage of the crystal approach over traditional wet-chemical processing is that the correlation between different scenes is carried out in near real time and not limited by the time needed for film development or film replacement. Despite the success of modern correlators, however, they are hampered by an old but severe limitation for practical application. Even the modern correlator has not overcome the inability of traditional correlators, using matched filters, to recognize an object independent of its size or the viewed perspective.

SUMMARY OF THE INVENTION

In accordance with the invention a method is presented for cueing and alerting the presence and location of stationary or moving man-made objects in an arbitrary background using Fourier transform filtering. It is understood that the output of such a cuer would determine if any man-made objects were present and if so their location.

Accordingly, an object of the invention is to provide a method of producing, in near real-time, matched Fourier filters for use in matched filter type correlators.

A further object of the invention is to provide a near real-time target cuer that recognizes the presence of stationary or moving man-made objects.

It is a still further object of the invention to provide a near real-time target cuer that recognizes and determines the location of an object having particular shape features independent of its size or the viewed perspective.

The salient feature of this invention which distinguishes it from all other matched Fourier filter type correlators is that the matched filters are not prerecorded records of what objects look like but rather are filters derived in near real-time directly from the input images. Inherent in this methodology is the feature of size and aspect independence.

The invention described herein is concerned with the goal of cueing and alerting the presence of an object of interest. Cueing and alerting can be broken down into two primary steps. A lower-level one in which local feature differences provide cues via simple thresholding and a higher-level one which integrates these local feature differences into non-local shape differences. This invention addresses the higher-level cueing based on such shape differences.

For lower-level cueing and alerting, "interesting features" are image regions that are different from adjacent image regions. Thus for images in the familiar "visible" part of the electromagnetic spectrum these features are based on intensity, color, and textural image differences. Both positive and negative local gradients are of interest. For other spectral regions only some of these features will be useful dependent on object scattering characteristics, source and detector system capabilities, and atmospheric propagation. The important element is that the characteristics be detectable by a gradient (difference) measurement since it is relative image features that are of interest.

For higher-level cueing and alerting shape is essential. Shape is a non-local spatial feature involving an integration of object edges to form 2-dimensional surfaces as well as an integration of surfaces to form 3-dimensional volumes. An edge can not define an object unless it encloses an area or unless it is spatially combined with other edges so as to define an area. Shape is primarily defined by the edges delineating regions of different characteristics within a specific feature space. For visible images, edges are usually a local spatial feature related to intensity and color differences. Texture is a non-local spatial feature whose edges are often delineated by spatial frequency differences. Thus there are intensity edges, color edges, and textural edges the sum total of which constitutes the shape of an object. But shape is also determined from 3-dimensional clues as well. Shading in addition to stereopsis (triangulating—for two sensor systems) are very important shape descriptors. Thus shape is a higher order feature requiring a non-local spatial integration of local feature differences.

Distinctions in shape can be made between man made objects and natural objects. Man made objects are somehow regular while natural objects are irregular.

This, of course, it not true at all size scales of inquiry (crystalline substances for instance), however it is true at the scale of man-made sized objects. In addition it is not so much the overall shape that is different, but rather the shape of the parts. Man made objects are constructed from two basic shapes: rectangles for the simplicity and reproducibility of manufacture, and circles for the facility of motion.

Intuitively, the simpler the object the more spatial symmetries it will exhibit. Thus the circle, the simplest of two dimensional geometrical forms with non-zero area, will have the most spatial symmetries. For example, any rotation of the circle about any axis perpendicular to the plane of the circle yields an object with the exact profile of the original circle. Only its spatial location has been changed. Similarly, a 180-degree rotation of the circle about any axis, lying in the plane of the circle, and passing through the center of the circle yields an object with the exact profile of the original circle. It is in this sense that the term spatial symmetry is applied.

However, in any arbitrary observational encounter with a man-made object, the perspective will probably be oblique. Consequently, for objects that are at distances large compared to their size, circles will look like ellipses and rectangles will look like parallelograms. Thus for arbitrary viewing in range and aspect, these objects will appear to have various shapes. However, unlike natural objects, these man-made forms possess various spatial symmetries which can be used to distinguish them from other objects. The presence of symmetry will identify the presence of man-made objects within an image. Such spatial symmetries are evident by performing various particular spatial transformations on the input image. One example is a 180 degree rotation about an axis perpendicular to the plane of the image and passing through its center. The result of this particular spatial transformation is that no matter where located, both the ellipses and the parallelograms will look exactly the same, except they will be displaced spatially from the image quadrant they were initially in, to the diagonally opposite quadrant. Other objects will also be similarly displaced; however, if they are not man made (and thus do not possess regions of symmetry) they will upon rotation, no longer appear the same, but rather inverted. We say that that an ellipse and a parallelogram posses "inversion" symmetry.

Another spatial transformation useful in the detection of man-made symmetries is reflection in which an object will appear symmetrical about some axis lying within the plane of the image. For example, man-made objects are often found standing in a direction parallel to that of the local gravity. Choosing an axis along this direction will often delineate the axis about which reflective symmetries (180° rotation) can be detected.

Consequently, to test an image scene for the presence of objects with a specific spatial symmetry, we only have to perform the spatial transformation on the image characteristic of that symmetry and then compare the resulting image with a copy of the original untransformed image. Two such images are termed a filter pair. Thus, upon "crosscorrelation" of the image with its transformed "self", which mathematically is nothing more than the 2-dimensional spatial displacement of one image over the other (rotations are not allowed), a match or correlation will be obtained for only those objects which possess symmetry to the transformation performed. Objects or parts of objects possessing the spatial symmetry will appear unchanged while objects in the image that do not possess the property will appear changed. Clearly, objects possessing more than one spatial symmetry will be easier to locate than objects possessing only one. Here the word "changed" means spatially different.

Equivalence Of Fourier and Spatial Operations

Since an image and the Fourier transform of an image are by definition mathematically related we can say each is an equivalent representation of the information content of a scene. The mathematical form for the crosscorrelation is:

$$Ic(X,Y) = |[\int\int \int IM1(X,Y)^* IM2(X-Xo, Y-Yo) dXo\, dYo]|^2$$

where Ic is the correlation at spatial point X,Y, and IM1 and IM2 are images 1 and 2 respectively. Thus the correlation is the square of the absolute value of the 2-dimensional integral, of images 1 and 2, obtained by summing over all points Xo, Yo, where Xo and Yo is the X and Y displacement of image 2 from image 1. The resulting correlation map is itself presentable as an image, twice the size of the original image, where the intensity, Ic, at each point X,Y is proportional to the square of the number of spatial points of overlap in images 1 and 2. Using Parsaval's theorem the above spatial integral over Xo and Yo is shown to be equivalent to the square of the absolute value of the inverse Fourier transform of the product of the Fourier transform of image 1 with the hermitian conjugate of the Fourier transform of image 2:

$$Ic(X,Y) = |[\int\int F^{-1}\{F[IM1](Fx,Fy)^* F^*[IM2](Fx,Fy)\} dF_x dF_y]|^2$$

Thus, not only are the image and its Fourier transform equivalent representations but so are correlations using these representations. This result is particularly useful since implementation of the Fourier transforms can be performed at speeds approaching video frame rates, both digitally on a computer, or optically using lenses.

The foregoing and other objects and advantages of the invention will appear from the following description. In the description reference is made to the accompanying drawings which form a part hereof, and in which there is shown by way of illustration and not of limitation preferred embodiments. Such description does not represent the full extent of the invention, but rather the invention may be employed in different arrangements according to the breadth of the invention.

BRIEF DESCRIPTION OF THE DRAWINGS

FIGS. 3(a) and (b) show schematics of (a) an optical inverter; and (b) a mirror image generator, that may be used in optical embodiments of the present invention.

DESCRIPTION OF THE PREFERRED EMBODIMENTS

Referring now to the drawings, like reference numerals represent identical or corresponding parts throughout the several views.

It is to be understood that the term "image" will refer to black, white and grey level mappings of spatially local image characteristics such as intensity, color saturation and color hue as well as the non-local image characteristic of texture. It should also be understood that whereas unity magnitude phase only correlation is emphasized in the specific embodiments disclosed below, any other edge enhancing technique, such as the application of gradient operations before correlation, could be substituted. The essential point is that correlation of edge enhanced, or edge only image representations, sharpens correlation peaks and therefore greatly improves object localization.

General Embodiment

Figure 1:
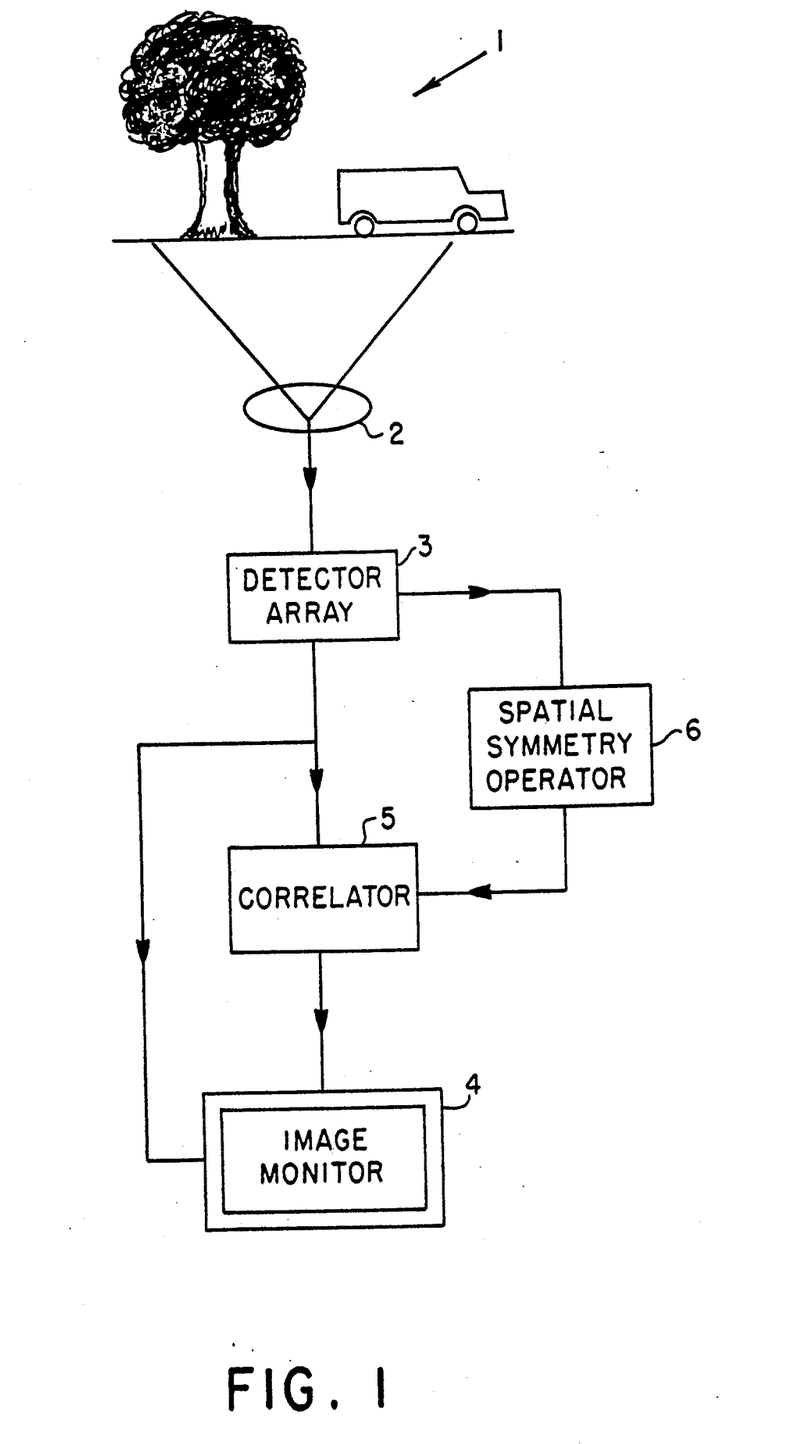
FIG. 1 shows a schematic of a general target cuer according to the present invention.

FIG. 1 shows a general schematic of a man-made object target cuer according to the invention. An arbitrary scene 1 is captured in real time by any convenient means for forming an image of the scene. While the arbitrary scene in which the input image is formed can be derived from any electromagnetic signal such as infrared or synthetic aperture radar, in addition to non-electromagnetic signals such as sonar and acoustics, the discussion will be confined to images formed from visible light since all of these images can first be displayed on a monitor and then processed. In such a case, optics 2 can capture an image for detection by a detector array 3. The original image of the scene is taken from the detector 3 array and sent to an image monitor 4 and correlator 5. To test the original image for the presence of objects or object parts with a specific spatial symmetry operator we only have to perform the spatial transformation on the image and then compare the resulting image with the original untransformed image. Therefore, a duplicate image of the scene is taken from the detector 3 and sent to a spatial symmetry transformer 6 which spatially symmetry transforms the duplicate imaage. The spatially symmetry transformed duplicate image is then sent to the correlator 5 where it is cross-correlated with the original image. The output information of the correlator 5 is matched or compared with the original image at image monitor 4. Information in the output of the crosscorrelator 5 represents man-made objects or object parts having symmetry in the arbitrary scene 1 and may be used to locate those objects within the scene 1. Specific embodiments are disclosed below.

Digital Embodiment

Figure 2:
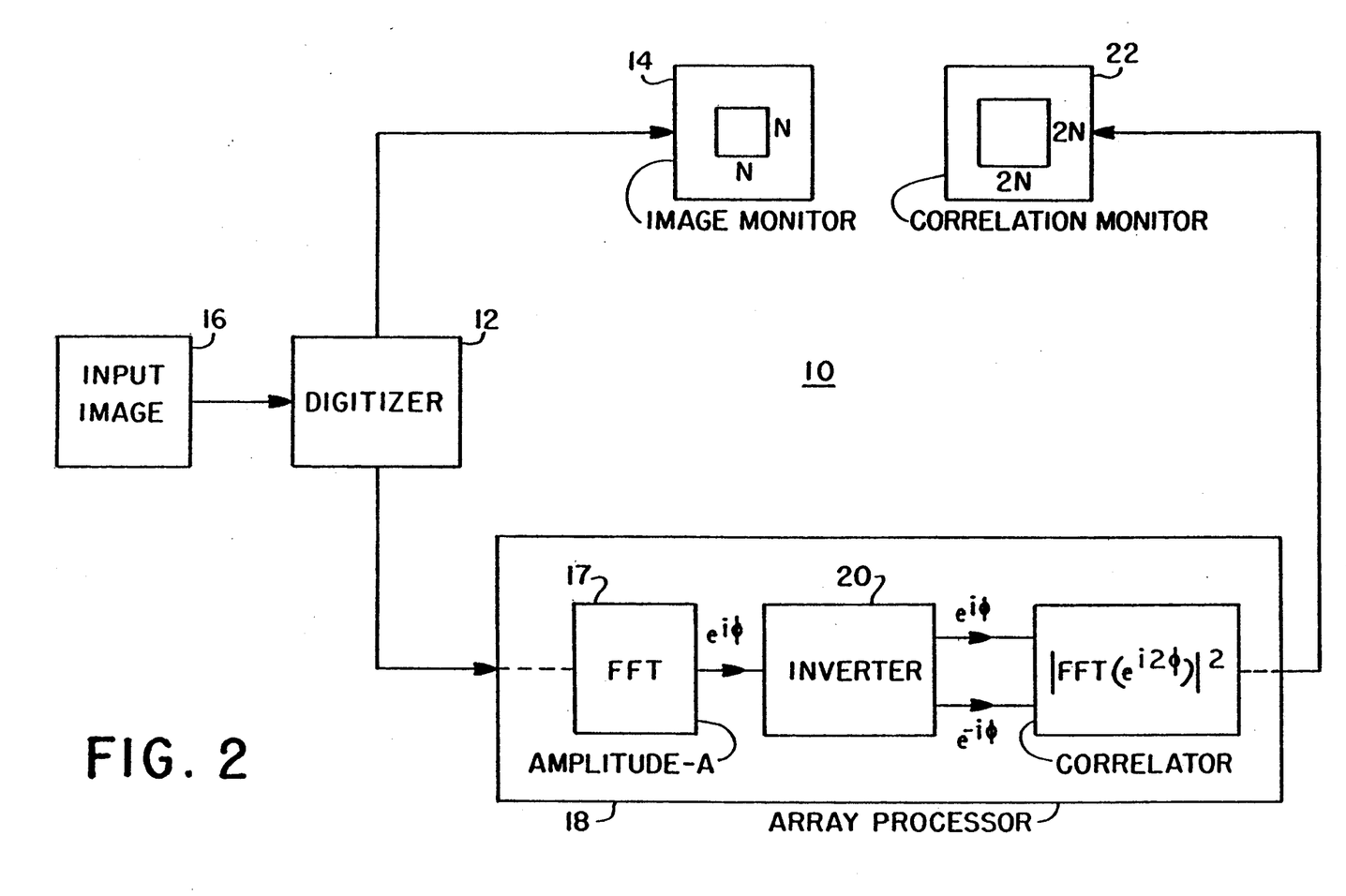
FIG. 2 shows a schematic of a digital embodiment of a target cuer according to an aspect of the present invention.

FIG. 2 shows a schematic of a digital embodiment of a man-made object target cuer 10 implemented on a computer. The cuer 10 digitizes an input image 16 with a digitizer 12 and displays the digitized image on an input image monitor 14 while another digitized version is sent to an array processor 18 which performs a fast Fourier transform (FFT) 17. The array processor 18 converts the real and imaginary parts of the FFT of the image into its Magnitude A, and phase $\phi$, $Ae^{i\phi}$. Correlation of two such images is performed by multiplying the two phase-only representations of the FFT's of the two images, performing an inverse FFT on the product, and then taking the magnitude square of the complex representation obtained. Using phase only FFT's localizes and sharpens correlation peaks by effectively edge enhancing images. A 20-MFLOP array processor plug-in to a 386/16-MHz, 80386 microprocessor based computer, with a 80387-coprocessor and with an image processing package can capture a 256×256 pixel representation of an image in about 1/60 sec., extract a 64×64 pixel subimage, process the subimage as indicated above, and output the 128×128 pixel cross-correlation intensity squared distribution image in about 1.5 seconds. Available faster computer hardware can complete this result in about 1/30 second.

As mentioned earlier there is an equivalence of performing correlation operations in spatial and frequency space. In addition, since symmetry transformed images are related to the originals, the FFT's are also. This greatly simplifies computations since this reduces the number of FFT's needed from 3 to 2. Thus, for example, for the case of image inversion, all positions x,y are changed to $-x, -y$. For the FFT this is equivalent to multiplying the phase of the original FFT by $-1$. For the case of image reflection about the central x or y axis, positions are changed to $x,-y$ or $-x,y$ respectively. For the FFT this is equivalent to exchanging components at spatial frequencies Kx,Ky for those at $-$Kx,ky or kx,$-$ky respectively. Thus only one FFT has to be performed for each of the image filter pairs.

The degree of correlation is determined by the spatial overlap of objects within in image. Objects that are spatially similar will show a high degree of correlation. This will also be true of objects that are symmetrical under some symmetry transformation. Conversely, objects that are not symmetrical under the transformation will appear different or changed and thus will give poor correlation. Bright spots or regions on the correlation monitor 22 represent the relative position of potential objects of symmetry. In particular, if a bright spot appears at correlation point (x,y) (with (0,0) representing the center of the correlation image) then in the image the object of symmetry will appear at $(-x/2, -y/2)$. The offset from the center of the correlation image is thus a measure of how far off the center the symmetrical object is in the original image. Driving the magnitude of this offset to zero, by moving the detectors, centers the imaging system on the object: i.e., an object of symmetry at the center of an image when correlated against its inversion gives a correlation signal at the center of the correlation plane. This demonstrates the detection and pointing capabilities of the system. The speed of these processes is only limited by the size (N×N pixels) of the digitized image, the array processor speed, and input-/output transfer rates.

Optical Embodiment

Figure 3A:
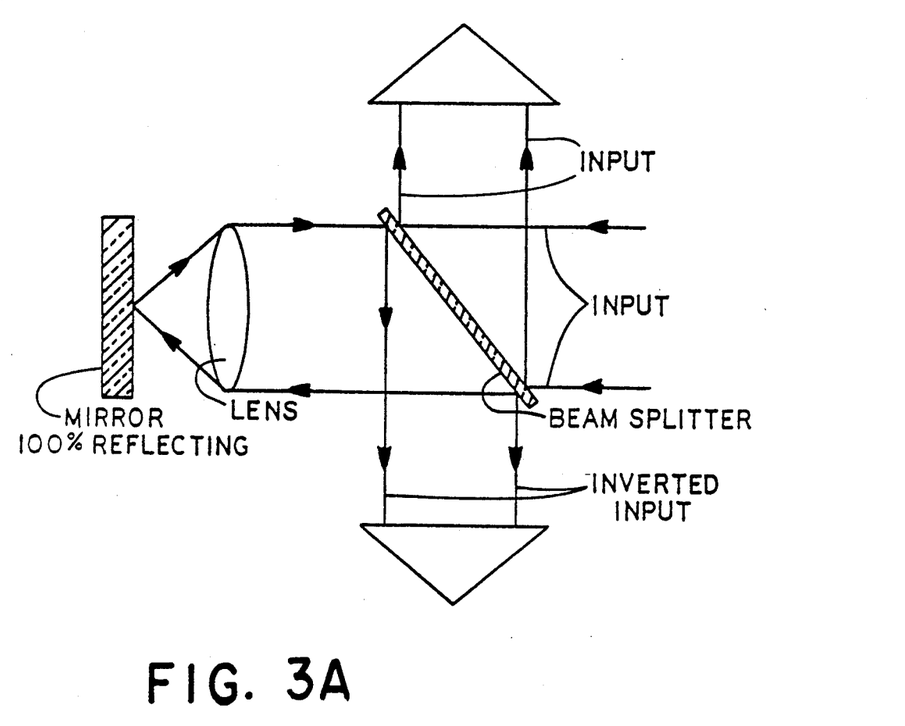
Figure 3B:
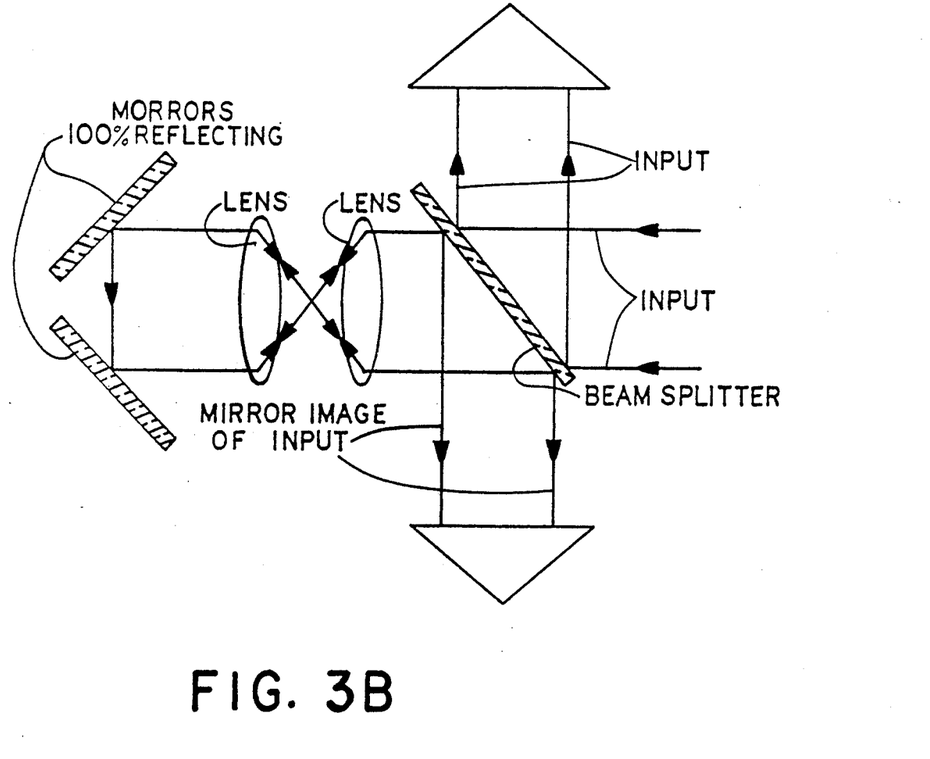

FIG. 3(a) and (b) shows that, optically, the inversion (a) and reflection (b) can be accomplished through the use of lenses and mirrors alone. In these cases the cross-correlation can be accomplished using coherent optical techniques. Such an experimental demonstration has been presented. (See Khadr et al., "Symmetry perception by optical transformation," Technical Digest, Optical Society Of America, Vol. 22, pg. 33, 1987)

Figure 4:
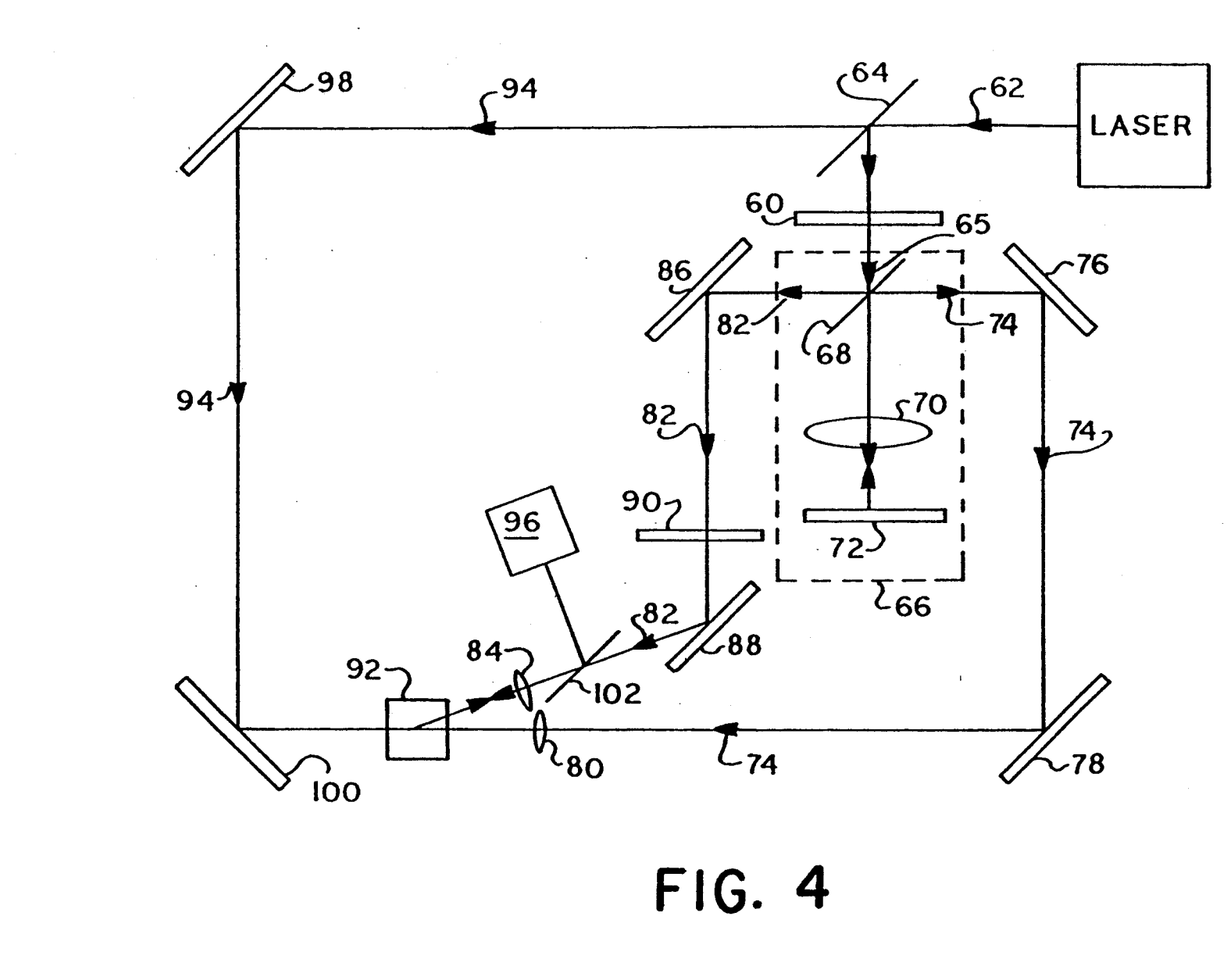
FIG. 4 shows a schematic of an optical embodiment according to an aspect of the invention.

FIG. 4 shows the system set-up for an optical implementation of the present invention. A laser beam 62 is generated and is divided by a beam splitter 64. Part of the laser beam is directed through a metalized glass slide 60 in which an image has been encoded in its etched surface. After the laser beam passes through the glass slide 60, creating an optically encoded image beam, it travels along a path 65 to an inverter 66. The inverter 66 comprises a beam splitter 68, a lens 70 and a mirror 72. The beam splitter 68 directs a copy of the optically encoded image beam along a path 82 to a lens 84 deflecting off mirrors 86 and 88 while that part of the optically encoded image beam that passes through the beam splitter 68 is inverted by lens 70 and mirror 72. The optically encoded inverted image beam then travels along path 74 to a lens 80 by deflecting off beam splitter 68 and mirrors 76 and 78. Attenuator 90 is placed in the path 82 for equalizing the intensity of the optically encoded image beam that travels path 82 with the optically encoded inverted image beam that travels path 74. Lenses 80 and 84 each perform Fourier transform operations on the optically encoded inverted image beam and the optically encoded image beam respectively. A phase conjugating crystal 92 (such as barium titanate) records the product of the Fourier fields created by lenses 80 and 84. The inverse Fourier transform of this product is performed by directing laser beam 62 along path 94 through the crystal 92. Upon scattering from the index of refraction grating formed from the interference of beams traveling paths 82 and 74, beam 62 travels through lens 84, where it is Fourier transformed, to a silicon image intensifier 96. Mirrors 98 and 100 and beam splitter 102 are merely used to direct the laser beam 62 along path 94. The experiment conclusively demonstrated that the symmetry detecting operation could be performed optically. The speed of calculation was limited to about 1 second due to the response time of the crystal. Higher speeds are possible by increasing the intensity of the laser beam. Though non real-time, photochemically produced images were utilized, spatial light-modulators could have been used to provide a real-time capability. Such a better system is described below.

Hybrid Embodiment

Figure 5:
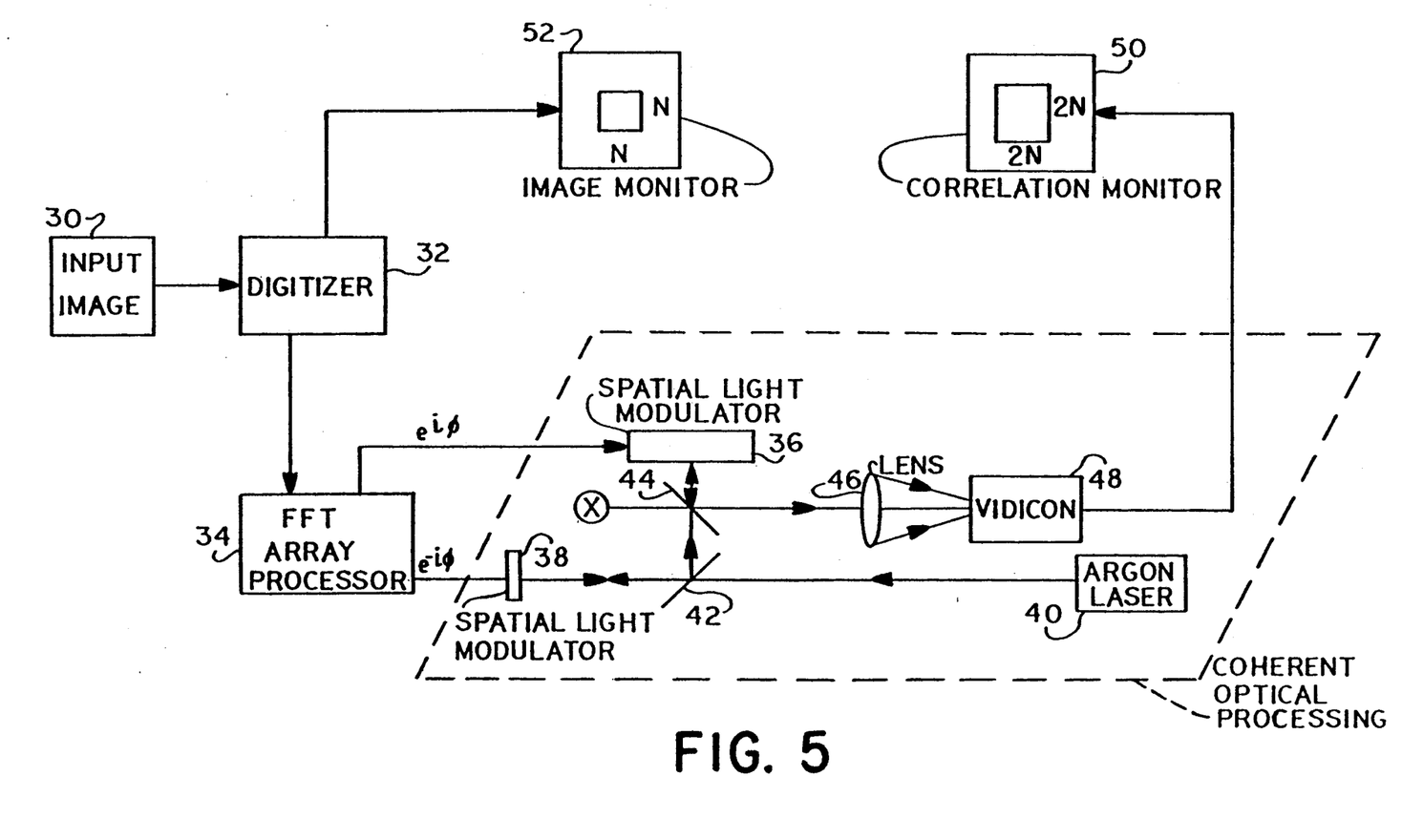
FIG. 5 shows a schematic of a hybrid digital/optical embodiment according to an aspect of the invention.

Ideally the correlation could be better accomplished by a hybrid digital/optical implementation as shown in FIG. 5. An input image 30 is computer digitized by digitizer 32 and an FFT is calculated by array processor 34. Only the phase part of the FFT is kept. In general any spatial light modulator (SPL) could be used to encode the digitized FFT upon the laser beam 40. Some SPL's operate in a transmissive mode in which the laser beam, upon passing through the material, becomes amplitude or phase modulated. Other SPL's accomplish the same modulation operating in a reflective mode. Example devices are obtainable from Texas Instruments (DMD—deformable mirror devices) and Semetex (SM—Sight Mod). For this discussion a reflective SPL will be chosen. The original image's FFT phase information is impressed electronically on a first SPL 36. On a second SPL 38 the spatial frequency transformed phase is impressed. This then forms the symmetry testing filter element. An argon laser beam 40 passes through beam splitter 42 to the second SPL 38. The phase encoded beam reflected from SPL 38 is directed by the beam splitter 42 toward SPL 36. The laser light reflected from SPL 36 will only scatter back toward beam splitter 42 if there is a phase match with the filter phase. If there is a match the scattered light is directed by beam splitter 44 toward the lens 46. It is then inverse Fourier transformed by the lens 46, and then the correlation intensity pattern imaged by vidicon 48. This image can then be displayed on a correlation monitor 50 and compared with the image on the image monitor 52.

Example of Computer Implementation

Figure 6:
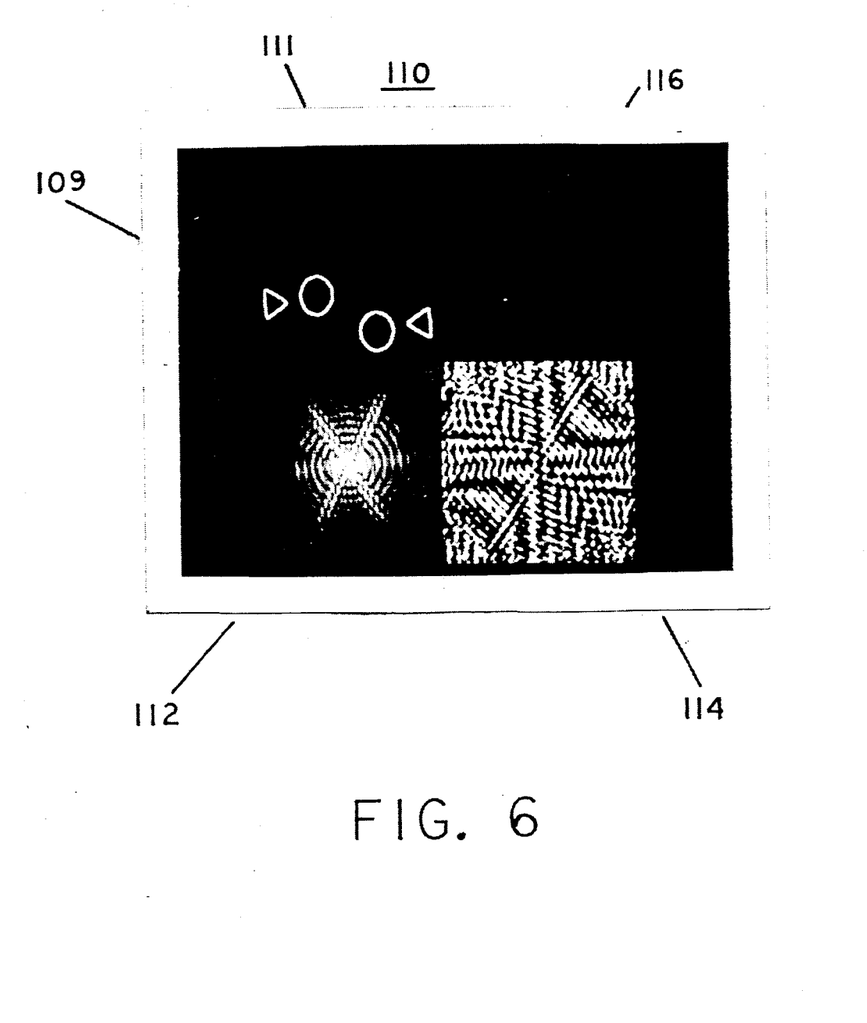
FIG. 6 shows actual input and ouput images from a computer generated cueing device as described in FIG. 2.

Operation of the target cuer is further described in the following example. This example, performed on a computer, shows the steps necessary to test an image for inversion symmetry. FIG. 6 shows four quadrants of information concerning an image of a circular ring and a line triangle. Performing the process as described hereinabove an image-detail is extracted, a spatial transformation is applied to generate its filter pair, and the crosscorrelation is computed. The format for the presentation of the crosscorrelation of such a filter pair is as follows; (1) The 256×256 pixel frame is divided into four quadrants; (2) The image in the upper left quadrant 110 contains, side-by-side, the two 64×64 filter pair images 109 and 111; (3) The image in the lower left quadrant 112 contains the magnitude of the log-amplitude of the Fourier transform of the original image-detail (that is the spatial frequency distribution of intensity in the original image-detail.); (4) The image in the lower right quadrant 114 will be the magnitude of the phase, 0 to 180 degrees (scaled to 256 shades of gray), of the Fourier transform of the original image detail (that is the spatial frequency distribution of phase edges) and finally; (5) The image in the upper right quadrant 116 will be the magnitude squared of the crosscorrelation of the filter pair.

The results are shown in FIG. 6. The image 110 in the upper left quadrant contains two adjacent images. The image detail 109 is on the left and its filter pair 111, created by a 180 degree rotation about the image detail's center, is on the right.

The image in the lower left quadrant 112 is the amplitude of the Fourier transform of the image detail. The Fourier amplitude is the linear supposition of the Fourier transforms of each individual object in the image independent of object position. Zero spatial frequency is located at the center of this image. Thus the Fourier transform of the circular ring is a series of concentric rings. For the triangle three patterns are present, one for each of the three edge segments. The Fourier pattern for any one line segment is a linear intensity pattern of "unequal length dashes" oriented at right angles to the line segment. This is very much like that of the optical diffraction pattern of a slit. The Fourier pattern for the three lines of the triangle thus forms a star pattern centered at zero spatial frequency. The final Fourier transform amplitude image is the sum of these individual patterns.

The image in the lower right quadrant 114 is the phase of the Fourier transform as a function of spatial frequency. The phase is spatial position dependent since any spatial translation in image space is equivalent to a phase change in spatial-frequency space. Thus the same scene with an object placed at different locations will have different Fourier phase representations but only one Fourier amplitude representation.

The image in the upper right quadrant 116 represents the crosscorrelation of this filter pair. The brighter the pixel the greater the degree of correlation. Bright pixels in the center of the correlation plane correspond to the correlation of regions within the two images when the two images overlap, center to center. Bright regions at all other locations in the correlation plane correspond to correlations derived from displacements of one image relative to the other. The displacement of the particular point of correlation relative to the center of the correlation plane is directly related to the magnitude and direction of the relative displacement of the two images. Thus for this image, and its filter pair, one region of good correlation is apparent.

Obviously, numerous modifications and variations of the present invention are possible in light of the above teachings. For example, it should be understood that wereas unity amplitude phase only correlation is emphasized above, any edge enhancing algorithm may also be useful. Thus correlation of original amplitude and phase components with unity amplitude but symmetry transformed phase Fourier components should be considered, as well as phase only correlation of edge enhanced filter pair images. It is therefore to be understood that within the scope of the appended claims, the invention may be practiced otherwise than as specifically described herein.

What is claimed is:

1. A method of finding man-made objects in an arbitrary scene comprising the steps of:
   detecting an image of said arbitrary scene;
   creating a duplicate representation of said image;
   performing a symmetry transformation on said duplicate representation forming a symmetry transformed duplicate representation;
   performing a crosscorrelation between said image and said symmetry transformed duplicate representation; and
   identifying the presence of said man-made object in said image by matching crosscorrelation information with said image.

2. The method of finding man-made objects in an arbitrary scene as defined in claim 1 wherein the step of forming a duplicate representation of said arbitrary scene comprises the steps of:
   edge enhancing said image; and
   forming a duplicate representation of said edge enhanced image.

3. The method of finding man-made objects in an arbitrary scene as defined in claim 1 wherein the step of performing symmetry transform on said duplicate representation comprises the steps of:
   generating a Fourier transform of said duplicate representation;
   dividing said Fourier transform of said duplicate representation image into its original magnitude component and its phase component;
   changing said original magnitude component to a unity magnitude component;
   forming a duplicate of said unity magnitude component and said original phase component;
   spatial frequency transforming said duplicate representation in accordance with a particular spatial symmetry test.

4. The method of finding man-made objects in an arbitrary scene as defined in claim 3 wherein the step of performing a crosscorrelation comprises the steps of:
   multiplying said spatial frequency transformed duplicate of said unity magnitude component and said original phase component with said Fourier transform of said duplicate representation forming a product;
   generating an inverse Fourier transform of said product; and
   generating crosscorrelation information by squaring the magnitude of said inverse Fourier transform of said product.

5. The method of finding man-made objects in an arbitrary scene as defined in claim 1 wherein the step of forming an image of said arbitrary scene comprises the step of:
   digitizing said image of said arbitrary scene for viewing.

6. The method of finding man-made objects in an arbitrary scene as defined in claim 5 wherein the step of forming a duplicate representation of said arbitrary scene comprises the steps of:
   generating a Fourier transform of said digitized image of said arbitrary scene;
   dividing said Fourier transform of said digitized input image into its original magnitude component and its original phase component; and
   generating a duplicate of said original phase component.

7. The method of finding man-made objects in an arbitrary scene as defined in claim 6 wherein the step of performing a symmetry transform on said duplicate representation comprises the steps of:
   generating a spatial symmetry testing Fourier filter component by spatial frequency transforming said duplicate of said original phase component;
   impressing electronically on a first spatial light modulator said symmetry testing Fourier filter component; and
   impressing electronically on a second spatial light modulator said original phase component of said Fourier transform of said digitized input image.

8. The method of finding man-made objects in an arbitrary scene as defined in claim 7 wherein the step of performing crosscorrelation between said image and said symmetry transformed duplicate representation comprises the steps of:
   producing a beam of coherent light;
   directing said beam of coherent light to said first spatial light modulator;
   reflecting said beam of coherent light off said first spatial light modulator;
   directing said beam of coherent light, after it has reflected off said first spatial light modulator, to said second spatial light modulator;
   reflecting scatteringly said beam of coherent light off said second spatial light modulator if there are matches between said original phase component and said symmetry testing phase component;
   directing said beam of coherent light, after it has reflected scatteringly off said second spatial light modulator, to a lens;
   generating an inverse Fourier transform of said beam of coherent light by passing said beam through said lens.

9. A method of cueing in real time the presence of an object or object part having symmetry within an arbitrary scene comprising the steps of;
   forming an input image from said arbitrary scene for viewing;
   generating a Fourier transform of said input image;
   dividing said Fourier transform of said input image into its original magnitude values and its original phase values;
   changing said original magnitude values to a new value of unity;
   forming a duplicate of said original phase values;
   generating a symmetry testing Fourier filter by spatial frequency transforming said duplicate of said original phase values and said unity magnitude values;

crosscorrelating said symmetry testing Fourier filter with said unity magnitude values and said original phase values; and forming a crosscorrelation image from said crosscorrelation of said symmetry testing Fourier filter with said original magnitude values and said original phase values;

whereby bright regions in said crosscorrelation image represent objects or object parts having symmetry in said arbitrary scene.

10. A method of cueing in real time the presence of an object or object part having symmetry within an arbitrary scene comprising the steps of;

forming an input image of said arbitrary scene on a first plane;

forming a duplicate of said input image on a second plane maintaining spatial orientation;

spatially transforming said duplicate of said input image in relation to said input image;

crosscorrelating said spatially transformed duplicate of said input image with said input image using Fourier transforms in spatial frequency space; and forming a crosscorrelation image from said crosscorrelation of said spatially transformed duplicate of said input image with said input image for comparison with said input image;

whereby bright regions in said crosscorrelation image represent objects or object parts having symmetry in said arbitrary scene.

11. A method of cueing in real time the presence of an object or object part having symmetry within an arbitrary scene comprising the steps of;

digitizing an input image from said arbitrary scene for viewing;

forming a Fourier transform of said digitized input image;

dividing said Fourier transform of said digitized input image into its original magnitude component and its original phase component;

forming a duplicate of said original phase component;

generating a spatial symmetry testing Fourier component by spatial frequency transforming said duplicate of said original phase component;

impressing electronically on a first spatial light modulator said symmetry testing Fourier filter component;

impressing electronically on a second spatial light modulator said original Fourier phase component of said digitized input image;

producing a beam of coherent light;

directing said beam of coherent light to said first spatial light modulator;

reflecting said beam of coherent light off said first spatial light modulator;

directing said beam of coherent light, after it has reflected off said first spatial light modulator, to said second spatial light modulator;

reflecting scatteringly said beam of coherent light off said second spatial light modulator if there are matches between said original phase component and said symmetry testing phase component;

directing said beam of coherent light, after it has reflected scatterively off said second spatial light modulator, to a lens; and forming an inverse fast Fourier transform of said beam of coherent light by passing said beam through said lens to a means for viewing said inverse fast Fourier transform;

whereby said means for viewing said inverse fast Fourier transform of said beam of coherent light shows bright intensity patterns relating to objects or object parts having symmetry in said arbitrary scene.

12. An apparatus for cueing in near real-time the presence of an object or object part having symmetry within an arbitrary scene comprising:

means for forming an input image of said arbitrary scene and a duplicate image of said input image preserving spatial orientation of said duplicate image with said input image;

a first means for viewing said input image;

means for performing a Fourier transform on said duplicate image;

means for dividing said Fourier transform of said duplicate image into magnitude and phase components;

means for spatial frequency transforming said magnitude and phase components, in accordance with a particular spatial symmetry test, forming a symmetry testing Fourier filter;

means for correlating said symmetry testing Fourier filter with said magnitude and phase components forming a correlation image; and a second means for viewing said correlation image;

whereby bright regions in said correlation image represent objects or object parts having symmetry in said input image.

13. An apparatus for cueing in near real-time the presence of an object or object part having symmetry within an arbitrary scene as defined in claim 12 wherein said means for performing a Fourier transform on said duplicate image comprises:

a digital computer Fourier transform array processor.

14. An apparatus for cueing in near real-time the presence of an object or object part having symmetry within an arbitrary scene as defined in claim 12 wherein said means for performing a Fourier transform on said duplicate image comprises:

a lens.

15. An apparatus for cueing in near real-time the presence of an object or object part having symmetry within an arbitrary scene comprising:

means for digitizing an input image of said arbitrary scene and a duplicate image of said input image;

a first means for viewing said input image;

a Fourier transform array processor for performing a Fourier transform on said duplicate image and for dividing said Fourier transform of said duplicate image into magnitude and phase components;

means for spatial frequency transforming said phase component;

a first spatial light modulator for storing said phase component;

a second spatial light modulator for storing said spatial frequency transformed phase component;

a laser for generating a light beam which is directed to said second spatial light modulator causing said light beam to become encoded with said spatial frequency transformed phase component;

means for directing said light beam, after it has been encoded with said spatial frequency transformed phase component, to said first spatial light modulator where said encoded light beam reflectively scatters from said first spatial light modulator;

a lens;

means for directing said light beam, after is has reflectivley scattered from said first spatial light modulator, to said lens for focusing said light beam into a correlation image; and a second means for viewing said correlation image;
whereby bright regions in said correlation image represent objects or object parts having symmetry in said input image.

* * * * *